United States Patent
Cai et al.

(10) Patent No.: US 9,028,946 B2
(45) Date of Patent: May 12, 2015

(54) CERAMIC HONEYCOMB STRUCTURE WITH APPLIED INORGANIC SKIN

(75) Inventors: Jun Cai, Midland, MI (US); Aleksander J. Pyzik, Midland, MI (US); Michael T. Malanga, Clarkston, MI (US); Kwanho Yang, Midland, MI (US); Steve J. Martin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 740 days.

(21) Appl. No.: 13/380,846

(22) PCT Filed: Jun. 24, 2010

(86) PCT No.: PCT/US2010/039835
§ 371 (c)(1),
(2), (4) Date: Dec. 25, 2011

(87) PCT Pub. No.: WO2011/008461
PCT Pub. Date: Jan. 20, 2011

(65) Prior Publication Data
US 2012/0100336 A1  Apr. 26, 2012

Related U.S. Application Data

(60) Provisional application No. 61/221,427, filed on Jun. 29, 2009.

(51) Int. Cl.
| | |
|---|---|
| *C04B 41/00* | (2006.01) |
| *B01D 46/24* | (2006.01) |
| *C04B 41/50* | (2006.01) |
| *C04B 38/00* | (2006.01) |
| *C04B 41/85* | (2006.01) |
| *F01N 3/022* | (2006.01) |
| *C04B 111/00* | (2006.01) |
| *F01N 3/035* | (2006.01) |

(52) U.S. Cl.
CPC ....... *C04B 41/508* (2013.01); *Y10T 428/24149* (2015.01); *B01D 46/2444* (2013.01); *C04B 38/0006* (2013.01); *C04B 41/009* (2013.01); *C04B 41/85* (2013.01); *C04B 2111/00793* (2013.01); *F01N 3/0222* (2013.01); *F01N 3/035* (2013.01); *F01N 2510/065* (2013.01); *Y02T 10/20* (2013.01)

(58) Field of Classification Search
CPC   C04B 28/24; C04B 20/0048; C04B 41/5089; C04B 41/508; C04B 41/4539
See application file for complete search history.

(56) References Cited

U.S. PATENT DOCUMENTS

| | | | |
|---|---|---|---|
| 5,629,067 A | 5/1997 | Kotani | |
| 2004/0055265 A1* | 3/2004 | Ohno et al. | 55/523 |
| 2005/0050845 A1* | 3/2005 | Masukawa et al. | 52/782.1 |
| 2007/0151799 A1* | 7/2007 | Zuberi et al. | 181/256 |
| 2008/0187712 A1* | 8/2008 | Ichikawa et al. | 428/116 |
| 2009/0041975 A1* | 2/2009 | Kodama et al. | 428/116 |
| 2009/0239030 A1* | 9/2009 | Cai et al. | 428/116 |
| 2009/0239744 A1 | 9/2009 | Ohno | |
| 2009/0291827 A1 | 11/2009 | Ohno | |

FOREIGN PATENT DOCUMENTS

| | | |
|---|---|---|
| EP | 554104 A | 8/1993 |
| EP | 2105427 A | 9/2009 |
| EP | 2130600 A | 12/2009 |
| JP | 2000-102709 A | 4/2000 |

\* cited by examiner

*Primary Examiner* — David Sample
*Assistant Examiner* — Nicholas W Jordan

(57) ABSTRACT

A skin is applied to a ceramic honeycomb. The skin is formed by applying a skin-forming composition and drying it. The skin-forming composition includes a carrier liquid, colloidal silica and/or colloidal alumina, and an inorganic filler. The filler includes an inorganic fiber. The filler may contain low aspect ratio particles that have the same or nearly the same CTE as the inorganic fiber. The filler may include a small proportion of a low aspect ratio filler particle that has a different CTE than the inorganic fiber.

9 Claims, 1 Drawing Sheet

CERAMIC HONEYCOMB STRUCTURE WITH APPLIED INORGANIC SKIN

This application claims priority from U.S. Provisional Application No. 61/221,427, filed 29 Jun. 2009.

The present invention relates to a ceramic honeycomb structure having an applied inorganic skin.

Ceramic honeycomb structures are often used as filters or catalyst supports in high temperature applications. The honeycomb structures are frequently exposed to large, rapid changes in temperature during manufacture or use. For example, ceramic honeycombs are often used as particulate filters to remove soot particles or droplets from diesel engine exhaust. Those filters experience large temperature changes during the normal operation of the vehicle and when the filter is thermally regenerated to burn out the captured soot. Large, rapid temperature changes such as these are sometimes referred to as "thermal shock" events.

These rapid temperature changes usually create temporary but significant temperature gradients within the honeycomb structure, which in turn lead to the creation of large localized stresses due to non-uniform thermal expansion (or thermal contraction) within the part. When these localized stresses exceed the strength of the part, the structure will relieve the stress by cracking, which can lead to part failure.

The periphery of the part often experiences the highest thermally-induced stresses, especially during rapid temperature increases. As a result, cracking often initiates at the periphery of the structure. Some peripheral cracking usually can be tolerated, but, once cracking is initiated, it can propagate inwardly and cause the part to fail.

Ceramic honeycomb structures are usually produced with an exterior "skin", which is generally made up of the walls of the outermost cells of the structure. This skin can be removed and replaced with another ceramic material. There have been various reasons for doing this. In some cases, the "new" skin may have a surface that is roughened, raised or indented. These features permit the skin to better grip its enclosure, so that it better maintains its position within a diesel engine exhaust system.

U.S. Pat. No. 7,083,842 describes a ceramic honeycomb structure in which the original peripheral region of the structure is removed and replaced with an inorganic coating that is dried to form a replacement skin. The coating composition includes an inorganic binder, ceramic fibers of up to 100 microns in length, and particles having a diameter of from 0.5 to 100 microns. The various components of the coating composition, and in particular the size of the particles and fibers, are selected together so that the dried coating has a specified surface roughness. The particles should contain a crystal phase that is the same as the main crystal phase of the honeycomb structure, presumably to match the coefficient of linear thermal expansion of the skin with that of the underlying honeycomb structure.

Fiber-containing cements have sometimes been used to assemble a honeycomb structure from two or more smaller honeycombs. In U.S. Pat. No. 5,914,187, for example, such a cement includes an inorganic binder such as a glassy silica phase, as well as both ceramic fibers and other inorganic powders or whiskers. The powders or whiskers are used to increase the thermal conductivity of the cement. U.S. Pat. No. 7,112,233 describes a similar cement, which in this case is formulated to have a specific thermal conductivity. The cement described in U.S. Pat. No. 7,112,233 includes silica-alumina fibers which are at least 1 mm in length. According to U.S. Pat. No. 7,112,233, shorter fibers do not permit an "elastic" structure to be formed. The needed thermal conductivity is provided by including silicon carbide, silicon nitride or boron nitride particles in the cement formulation. However, due to the position of these cement layers between sections of the constituent honeycomb structures, these cements do not experience the same types or same levels of thermally-induced stresses that are normally seen at the periphery of the honeycomb structure. The function of the cements is mainly to hold the constituent parts together and to transfer heat efficiently. In cement applications, the presence of fibers tends to lower the thermal mass and thermal conductivity of the cement layer due to inefficient packing.

One aspect of this invention is a ceramic structure having (1) a ceramic honeycomb containing multiple axially-extending cells that are defined by intersecting walls and (2) a ceramic skin that covers at least a portion of an outer periphery of the ceramic honeycomb, wherein the peripheral ceramic skin contains (a) an inorganic filler that includes at least 40 weight percent inorganic fibers and (b) a silicate, aluminate or alumino-silicate binding phase which binds the inorganic fibers together and bonds the peripheral ceramic skin to the ceramic honeycomb, and further wherein the peripheral ceramic skin contains at most about 5% by weight of low aspect ratio inorganic filler particles that have a different coefficient of linear expansion than the inorganic fibers. "Low aspect ratio" as used herein means an aspect ratio of less than about 10.

The ceramic structures of the invention are useful in variety of filtration, heat exchange and catalytic applications. The ceramic skin shows a significantly decreased tendency to crack during thermal shock events, compared to many other skin materials. Even when cracks do form in the skin, they are less likely to propagate through the honeycomb structure and cause the part to fail. Therefore, the ceramic structures are particularly useful in applications in which the structure is exposed to rapid and large changes in temperature. The skin has the further advantage of being made from a simple, easily-prepared and -applied skin composition.

In another aspect, this invention is a process comprising the steps of (a) forming a ceramic honeycomb containing multiple axially-extending cells defined by intersecting walls, (b) removing an outer portion of the ceramic honeycomb to expose the interiors of axially-extending cells that remain on the periphery of the ceramic honeycomb after the outer portion is removed, then (c) applying a skin-forming composition to at least a portion of the periphery of the ceramic honeycomb and then (d) firing the skin-forming composition to form an inorganic skin on at least a portion of the periphery of the ceramic honeycomb, wherein the skin-forming composition contains an inorganic filler that includes at least 40 weight percent inorganic fibers, a colloidal silica, colloidal alumina or mixture thereof which dries to from a binding phase and a carrier fluid, and further wherein the peripheral ceramic skin contains at most about 5% by weight, based on the solids content of the skin-forming composition, of low aspect ratio inorganic filler particles that have a different coefficient of linear expansion than the inorganic fibers after the drying step is completed.

Figure 1:
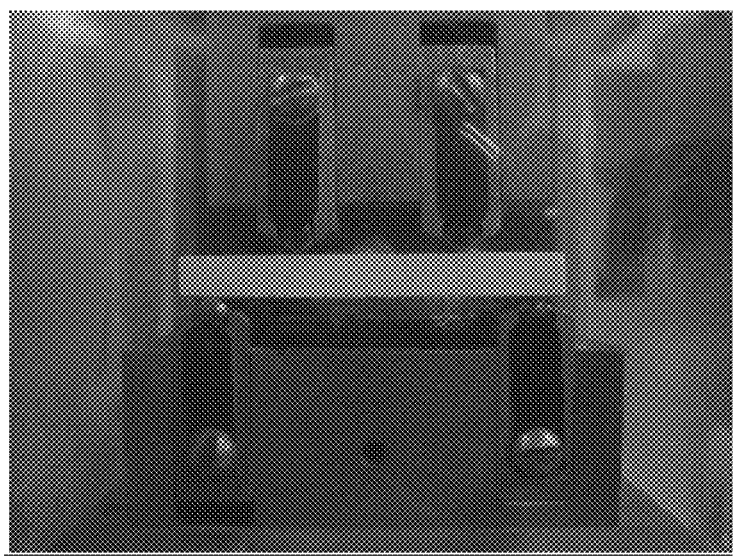
FIG. 1 is picture of the four point bend test used to determine the bending load displacement of the honeycomb structure of Example 1.

The ceramic honeycomb is characterized in having multiple cells that extend axially throughout the length of the honeycomb body. The cells are defined by multiple intersecting walls. The walls and the intersection points define the number of cells, as well as their cross-sectional size and dimensions. A typical honeycomb for many filtration or catalysis applications will contain from 25 to 1000 cells/square inch (about 4 to 150 cells/square centimeter) of cross-sectional area (i.e., transverse to the longitudinal extension). Wall thicknesses are typically from 0.05 to 10 mm, preferably from 0.2 to 1 mm, although larger or smaller wall thicknesses might be used.

The ceramic honeycomb may be monolithic (i.e., formed in a single piece), or may be an assembly of smaller honeycomb structures which are manufactured separately and then assembled together, usually using a ceramic cement to adhere the individual pieces together.

Ceramic honeycombs as manufactured typically have an outer peripheral "skin", which may be simply the exterior cell walls of the peripheral cells of the honeycomb. It is generally preferable to remove such a skin before applying a replacement skin in accordance with the invention. This is done by removing an outer portion of the ceramic honeycomb. The removal of the "skin" may be performed as part of a more general shaping process, in which outer portions of the ceramic honeycomb are removed to bring its cross-sectional shape and size to necessary specifications. This step of removing peripheral portions of the ceramic honeycomb exposes the interior of the axially-extending cells that remain on the periphery of the honeycomb after the removal step is completed.

The honeycomb is made of one or more ceramic materials, the selection of which is governed by the end-use applications in which the structure is to be used. Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, lithium aluminum silicates. Preferred porous ceramic bodies include silicon carbide, cordierite, acicular mullite or combination thereof. Silicon carbide honeycombs may be as described in U.S. Pat. No. 6,669,751B1, EP1142619A1 and WO 2002/070106A1. Examples of acicular mullite honeycomb structures include those described in U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773. Other suitable porous bodies are described by U.S. Pat. Nos. 4,652,286; 5,322,537; WO 2004/011386A1; WO 2004/011124A1; U.S. 2004/0020359A1 and WO 2003/051488A1.

When the ceramic honeycomb structure is to be used in applications such as filtration and catalysis, the walls of the honeycomb are preferably porous, so that a fluid can pass through the pores from one axially-extending cell to one or more adjacent cells. The walls of the honeycomb in such cases generally will have a porosity of about 30% to 85%. Preferably, the walls have a porosity of at least about 40%, more preferably at least about 45%, even more preferably at least about 50%, and most preferably at least about 55% to preferably at most about 80%, more preferably at most about 75%, and most preferably at most about 70%. If the honeycomb is an assembly of smaller honeycombs that are cemented together, the cement layer(s) may have similar porosities. Porosities are determined by water immersion methods.

An inorganic skin is formed by applying a skin-forming composition to at least a portion of the periphery of the honeycomb, and then firing the composition under conditions that a silicate, aluminate or alumino-silicate binding phase forms. This glass binding phase binds inorganic fibers in the skin together and bonds the peripheral ceramic skin to the ceramic honeycomb. The skin-forming composition should be applied to all peripheral cells having exposed interiors.

The inorganic skin contains at least two components, the first being an inorganic filler that includes at least 40 weight percent inorganic fibers and the second being the silicate, aluminate or alumino-silicate binding phase. The inorganic skin contains no more than 5% by weight of low aspect ratio inorganic particles that have a different coefficient of linear expansion than the inorganic fibers after the drying step is completed.

The inorganic fibers are composed of one or more inorganic materials that may be amorphous, crystalline or partially amorphous and partially crystalline. The fibers may be an amorphous or semi-crystalline material that at least partially crystallizes during the drying process or some subsequent thermal treatment. The particular selection of inorganic fibers in any case is generally made in consideration of the thermal conditions to which the fibers will be exposed during manufacture or use. The inorganic fibers should not melt or soften significantly during manufacture and use conditions, so that they maintain their fibrous geometry. Similarly, the inorganic fibers should not react or decompose during conditions of manufacture and use. It is usually not necessary that the inorganic fibers have a coefficient of thermal expansion similar to that of the underlying ceramic honeycomb, although this may be the case.

The inorganic fibers have an aspect ratio (longest dimension divided by shortest dimension) of at least 10, preferably at least 20. Any longer aspect ratio can be suitable, although aspect ratios of up to about 100 are more common. Generally, the diameter of the fibers is from about 0.1 micrometer to about 100 micrometers. The fiber diameter may be at least about 0.2, 0.4, 0.6, 0.8, 1, 2 or 4 micrometers to at most about 50, 25, 20, 15, 12, 10 or 8 micrometers.

The number average length of the inorganic fibers may range from 100 microns to 130 millimeters or more. The number average length is preferably at least 150 microns. The number average length is preferably no greater than 10 millimeters. The number average length may be no greater than 5 millimeters or no greater than 2 millimeters. Longer fibers, such as those having lengths of 10 mm or more, often tend to form bundles during processing. These bundles cause difficulties in applying the skin and also lead to inconsistencies in the skin composition. Therefore, longer fibers preferably are used somewhat sparingly if at all.

In some embodiments of the invention, essentially all of the fibers have a length of less than 1 mm.

In other embodiments, the fibers have a bimodal or multimodal length distribution, in which one portion of the fibers are shorter fibers having a number average length of from 100 to 1000 microns, and at least one other portion of the fibers are longer fibers having a number average length of at least 1 millimeter, preferably from 1 to 100 millimeters, more preferably from 2 to 100 millimeters and even more preferably from 5 to 30 millimeters. In such embodiments, the longer fibers preferably constitute from 1 to 50, more preferably from 3 to 30 and even more preferably from 5 to 25 percent of the total weight of the inorganic fibers. Mixed length fibers provide certain advantages. The presence of a minor proportion of longer fibers tends to increase the viscosity of the skin-forming composition, at a given fiber content in the composition. The viscosity of the skin-forming composition should be somewhat high, so it can be applied and shaped readily without sagging or flowing off of the honeycomb before it can dry. The presence of a minor proportion of longer fibers can allow a good working viscosity to be achieved without unduly increasing the fiber content. If the fiber content becomes too high, there may not be enough colloidal silica and/or colloidal alumina in the composition to adequately bind the fibers to each other or to the underlying honeycomb. Typically, the strength of the skin tends to decrease with increasing fiber length, because the number of fibers decreases as their length increases, and fewer fibers means fewer points of intersection where they can be bound together. When a mixture of shorter and longer fibers is used, the strength of the skin is often comparable to that of a skin that contains an equivalent proportion of only short fibers. Thus, a mixture of shorter fibers and a minor proportion of longer fibers can provide significant processing benefits with little or no corresponding disadvantages.

Fiber lengths and aspect ratios are determined for purposes of this invention by microscopic examination. A representative sample (100 to 200 is generally sufficient) of the fibers are examined under suitable magnification (such as under a scanning electron microscope), and the lengths and diameters of the individual fibers are measured. Number average length and aspect ratio are then calculated in known manner from the individual fiber measurements.

Suitable inorganic fibers include, for example, silicate or aluminosilicate fibers, which may be amorphous, partially crystalline or fully crystalline. The inorganic fibers may contain a crystalline phase that is surrounded by glass. The fiber may also contain other compounds such as rare earths, zirconium, iron, boron and alkaline earths. Examples of useful inorganic fibers include mullite fibers, such as are available from Unifrax; alumina-zirconium-silicate fibers, such as are available from Unifrax; alumina fibers containing up to 10% by weight silica, such as are available from Saffil; mullite fibers such as are available from Unifrax or 3M; α-alumina and α-alumina +mullite fibers such as NEXTEL 312 or NEXTEL 610 fibers from 3M; γ-alumina+mullite+amorphous $SiO_2$ fibers such as NEXTEL 440 fibers from 3M; γ-alumina+ amorphous $SiO_2$ fibers such as NEXTEL 550 fibers from 3M; quartz fibers such as are available from Saint Gobain; e-glass or s-glass fibers; borosilicate fibers such as are available from Mo-SiC Corporation; basalt fibers such as are available from Albarrie; wollastonite fibers such as are available from Fibertec; and the like.

The skin-forming composition may contain low aspect ratio inorganic filler particles in addition to the inorganic fibers described above. These inorganic filler particles are different from and do not include the colloidal silica and/or colloidal alumina component of the skin-forming composition. The inorganic filler particles do not form a binding phase when the skin-forming composition is dried. The inorganic filler particles instead retain their particulate nature throughout the drying process, although they may become bound by the glassy binding phase to other particles or to the inorganic fibers. As mentioned before, "low aspect ratio" refers to an aspect ratio of less than 10, preferably less than 5.

These inorganic filler particles can, for purposes of this invention, be classified into two types. The first type is particles that have the same CTE or very nearly the same CTE as the inorganic fiber (i.e., differing by no more than 1 ppm/° C. in the temperature range of from 100 to 600° C.), after the drying step is completed. The comparison is performed on the basis of the dried skin composition to account for changes in CTE that may occur to the fibers and/or other particles during the drying step, due to, for example, changes in crystallinity and/or composition that may occur. Particles of this type generally have the same or nearly the same chemical composition as the inorganic fiber. A common source of this type of particle is so-called "shot" material, which is a by-product of the fiber manufacturing process and is included in many commercial grades of inorganic fibers. However, this type of particle may be supplied from other sources as well.

The second type of inorganic filler particles have a CTE which is significantly different (i.e., different by more than 1 ppm/° C., more preferably by at least 2 ppm° C. in the temperature range from 100 to 600° C.) than that of the inorganic fibers, after the drying step is completed. One advantage of this invention is that it is not necessary to add fillers or otherwise attempt to "match" the coefficient of thermal expansion of the skin to that of the underlying honeycomb. Examples of this second type of inorganic filler particles are alumina, silicon carbide, silicon nitride, mullite, cordierite and aluminum titanate.

The skin-forming composition also contains colloidal silica, colloidal alumina or a mixture of colloidal silica and colloidal alumina. Such colloidal materials take the form of a particulate having a number average particle size of less than 1 micrometer, preferably less than 250 nanometers. The particles may be dispersed in water or other carrier liquid. The particles may be crystalline or amorphous. Preferably, the colloidal particles are amorphous. The colloid is preferably a silicate, aluminate, aluminosilicate sol. Colloidal silica products generally have a basic pH and a negative surface charge as determined electrophoretically. Colloidal alumina desirably has an acidic pH, where the alumina particles have a positive charge as determined electrophoretically. Illustrative colloids those available under tradenames such as KASIL and N, from PQ Corporation, Valley Forge, PA.; ZACSIL, from Zaclon Incorporated, Cleveland, Ohio; Sodium Silicates, from Occidental Chemical Corporation, Dallas, Tex.; NYACOL, Nexsil colloidal silica and Al20 colloidal alumina, from Nyacol Nanotechnologies Inc., Ashland Mass. and Aremco 644A and 644S, from Aremco Products Inc., Valley Cottage, N.Y.

The skin-forming composition also includes a carrier liquid. The mixture of carrier fluid and colloidal silica and/or colloidal alumina particles forms a paste or viscous fluid in which the inorganic filler is dispersed. The fluid or semi-fluid nature of the skin-forming composition permits it to be applied easily and to adhere well to the underlying honeycomb until the drying step is completed. The carrier liquid may be, for example, water or an organic liquid. Suitable organic liquids include alcohols, glycols, ketones, ethers, aldehydes, esters, carboxylic acids, carboxylic acid chlorides, amides, amines, nitriles, nitro compounds, sulfides, sulfoxides, sulfones and the like. Hydrocarbons, including aliphatic, unsaturated aliphatic (including alkenes and alkynes) and/or aromatic hydrocarbons, are useful carriers. Organometallic compounds are also useful carriers. Preferably, the carrier fluid is an alcohol, water or combination thereof. When an alcohol is used, it is preferably methanol, propanol, ethanol or combinations thereof. Water is the most preferred carrier fluid.

The cement may contain other useful components in addition to the inorganic filler, colloidal silica and/or colloidal alumina and carrier fluid. An organic binder or plasticizer can provide desirable rheological properties to the skin-forming composition, and therefore preferably is present. Preferably, the binder dissolves in the carrier liquid. Examples of suitable binders and organic plasticizers include cellulose ethers, such as methyl cellulose, ethyl cellulose, hydroxypropylmethyl cellulose, hydroxypropyl cellulose, carboxylmethyl cellulose and the like; polyethylene glycol, fatty acids, fatty acid esters and the like.

Other optional components include dispersants, deflocculants, flocculants, defoamers, lubricants and preservatives, such as those described in Chapters 10-12 of Introduction to the Principles of Ceramic Processing, J. Reed, John Wiley and Sons, N.Y., 1988. The skin-forming composition also may contain one or more porogens. Porogens are materials specifically added to create voids in the skin after being heated to form the amorphous phase. Typically these are any particulates that decompose, evaporate or in some way volatilize during a heating or firing step to leave a void. Examples include flour, wood flour, carbon particulates (amorphous or graphitic), nut shell flour or combinations thereof.

The fiber should constitute at least 10% by weight of the solids of the skin-forming composition, and may constitute up to 90% by weight thereof. For purposes of this calculation, the "solids" are constituted by the inorganic materials in the skin-forming composition, including fillers and inorganic binding phase, that remain in the skin after the cement composition is fired. In most cases, the solids will be made up of the inorganic fiber, the colloidal silica and/or colloidal alumina, plus any inorganic filler particles that may be present. Carrier fluids and organic materials generally are lost from the composition during the drying step(s) and are no longer present in the dried skin. The "solids" therefore do not include any amounts of those materials.

Typically the fibers constitute at least 30%, preferably at least 50 percent and more preferably at least 60% by weight of the solids in the skin-forming composition. The fibers preferably constitute no more than 85%, still more preferably no more than 80%, of the weight of the solids.

The colloidal silica and/or alumina should constitute from 10 to 70%, preferably from 15 to 50% and more preferably from 20 to 40% of the weight of the solids in the cement composition. Organic materials such as binders, porogens, plasticizers and the like typically constitute, in the aggregate, from 0 to 15%, preferably from 1 to 10% of the total weight of the skin-forming composition.

Low aspect ratio fillers, if present at all, may constitute up to two-thirds of the combined weight of the fibers and low aspect ratio fillers. Preferably, low aspect ratio fillers constitute no more than 25%, still more preferably no more than 15% of the combined weight of the fibers and low aspect ratio fillers. Low aspect ratio fillers of the first type mentioned above (having a CTE close to that of the fibers) may constitute up to two-thirds, preferably up to 25% and more preferably up to 10% of the combined weight of the fibers and low aspect ratio fillers. Low aspect ratio fillers of the second type described above (having a CTE at least 1 ppm/° C. different from that of the fibers) preferably constitute no more than 5% of the solids of the cement composition.

The fibers and low aspect ratio fillers may together constitute from 30 to 90%, preferably from 50 to 85% and still more preferably from 60 to 80% of the weight of the solids in the skin-forming composition.

In one preferred embodiment, the skin-forming composition contains, as fillers, only the inorganic fiber, "shot" material from the inorganic fiber, and optionally the second type of inorganic filler particle, which may be present in an amount from 0 to 5% by weight of the solids of the cement, but essentially no (less than 5 weight percent, preferably no more than 1%) other organic filler particles of the first type.

In another preferred embodiment, the skin-forming composition contains the inorganic fiber and from 0-5 weight percent, based on weight of the solids, of the second type of inorganic filler, but no "shot" material or other inorganic filler of the first type. Accordingly, the skin-forming composition may contain no inorganic filler particles of the second type at all, or may contain only very small proportions thereof, such as, for example, from 0 to 3% or from 0 to 2% or from 0 to 1% of the solids of the skin-forming composition.

The skin-forming composition contains enough of the carrier fluid to wet the colloidal silica and/or alumina and produce a paste or viscous fluid, in which the inorganic fibers are dispersed. A useful Brookfield viscosity at 25° C., using a #6 spindle and a rate of 5 rpm, is typically at least about 5, 10, 25, 50, 75 or even 100 Pa·s up to about 1000 Pa·s, preferably up to about 500 Pa·s. The skin-forming composition may exhibit shear-thinning behavior, such that its viscosity becomes lower at higher shear. The total amount of carrier fluid in the skin-forming composition (including any carrier fluid that may be brought in with the colloidal silica and/or colloidal alumina) is generally from about 25% by weight to at most about 90% by weight of the entire composition. A preferred amount of carrier fluid is from 40 to 70% by weight of the entire composition.

A skin is formed by applying the skin-forming composition to at least a portion of the periphery of the ceramic honeycomb and (d) drying the skin-forming composition. As mentioned, any pre-existing skin as may be present on the honeycomb preferably is removed before applying the skin-forming composition.

The manner of applying the skin-forming composition not critical, and any suitable method by which the composition can be applied at the desired thickness is suitable. The skin-forming composition can be applied manually or through the use of various types of mechanical apparatus. The skin-forming composition may be applied under sub-atmospheric pressures to facilitate removal of the carrier fluid during the application process.

The periphery of the ceramic honeycomb usually is not smooth, and in most cases a certain proportion of the axially-extending cells around the periphery of the honeycomb will be open before the skin is applied. The skin-forming composition typically will be applied in such a manner as to fill those open cells and to form a somewhat smooth exterior surface. Therefore, the thickness of the skin usually will vary. At its thinnest points, the applied skin should be at least 1 mm in thickness, and may be as much as 25 mm thick.

The applied skin-forming composition is then fired to form an inorganic skin on at least a portion of the periphery of the ceramic honeycomb. By "firing", it is meant that the composition is subjected to an elevated temperature sufficient to remove the carrier fluid, any organics that may be present, and to convert the colloidal silica and/or colloidal alumina into a binding phase which binds the inorganic fibers together and bonds the skin to the underlying honeycomb. In some cases, drying can be at least partially performed at approximately ambient temperatures, such as from 0 to 40° C. Much of the carrier fluid, for example, often is lost even as the skin-forming composition is applied. The firing step preferably includes a temperature of at least 600° C., which is generally sufficient to remove organic materials such as plasticizers, binders and porogens. The firing step may include a temperature of at least 800° C., at least 1000° C., at least 1100° C. or at least 1400° C. The time at which the coated honeycomb is exposed to such temperatures is sufficient to remove the carrier fluid (if any), burn out any organics as may be present and convert the colloidal silica and/or colloidal alumina into a binding phase. This time may be as short as a few minutes up to several hours. To prevent cracking due to thermal shock, it is preferred to bring the part gradually up to the maximum firing and/or calcination temperature, and when the firing process is completed, to gradually cool the part back to ambient temperatures.

It is possible to conduct the firing step in two or more discrete substeps, or to conduct a firing step followed by one or more calcining steps which are performed at higher temperatures. A calcining step is often useful to condition the skinned honeycomb to temperature conditions to which it will be exposed during its subsequent use.

When the ceramic honeycomb is an acicular mullite, the firing step can be combined with a thermal treatment step in which residual fluorine is removed from the honeycomb. The ability to combine these two operations into a single step can lead to the elimination of a process step and a corresponding reduction in production costs.

The product that remains after the firing step is a central ceramic honeycomb having a skin applied and bound to at least a portion of the periphery. The skin typically contains from 30 to 90%, preferably from 50 to 80% and more preferably from 60 to 80% by weight of inorganic fibers as described before. The fibers preferably have a number average length of greater than 100 microns, and may have a bimodal or multimodal size distribution as described before. The fibers preferably are randomly oriented within the skin. The skin also typically contains from 10 to 70%, preferably from 15 to 50% and more preferably from 20 to 40% of a silicate, aluminate or alumino-silicate binding phase. The binding phase binds the fibers to each other (and to inorganic filler particles, if present) and also binds the skin to the underlying ceramic honeycomb. The skin may contain low aspect ratio inorganic filler particles, but should not contain more than 5% by weight of low aspect inorganic filler particles that have a CTE significantly different from the CTE of the inorganic fibers.

The skin is usually porous. The porosity of the skin may be from 10 to 90%, and is more typically from 40 to 70%.

The skin material typically has a modulus that is significantly lower than that of the underlying ceramic honeycomb. Its modulus may be, for example in the range of 3 to 25% of that of the honeycomb material. It is believed that this lower modulus may be at least in part responsible for the higher crack resistance of the skin. The modulus of the skin material can be measured by forming 8 mm×4 mm×40 mm test bars from the skin-forming composition, drying them and measuring modulus according to ASTM 1259-98.

A skinned honeycomb in accordance with the invention exhibits excellent thermal shock resistance. A suitable method of evaluating thermal shock resistance is the cyclic burner test described in the following examples. In this method, the skinned honeycomb is subjected to increasingly harsh thermal cycles, and inspected for cracking after each of the cycles. On this test, the skinned honeycomb of the invention often exhibits significantly better resistance to thermal shocks, compared to an otherwise like honeycomb that contains its original skin. The skinned honeycomb typically passes at least conditions 1-6 of this test, and preferably passes all of conditions 1-7.

The skinned honeycomb can be used as a particulate filter, especially for removing particulate matter from power plant (mobile or stationary) exhaust gases. A specific application of this type is a soot filter for an internal combustion engine, especially a diesel engine.

Functional materials can be applied to the skinned honeycomb, before or after applying the skin, using various methods. The functional materials may be organic or inorganic. Inorganic functional materials, particularly metals and metal oxides, are of interest as many of these have desirable catalytic properties, function as sorbents or perform some other needed function. One method of introducing a metal or metal oxide onto the composite body is by impregnating the honeycomb with a solution of a salt or acid of the metal, and then heating or otherwise removing the solvent and, if necessary calcining or otherwise decomposing the salt or acid to form the desired metal or metal oxide.

Thus, for example, an alumina coating or a coating of another metal oxide is often applied in order to provide a higher surface area upon which a catalytic or sorbent material can be deposited. Alumina can be deposited by impregnating the honeycomb with colloidal alumina, followed by drying, typically by passing a gas through the impregnated body. This procedure can be repeated as necessary to deposit a desired amount of alumina. Other ceramic coatings such as titania can be applied in an analogous manner.

Metals such as barium, platinum, palladium, silver, gold and the like can be deposited on the composite body by impregnating the honeycomb (the internal walls of which are preferably coated with alumina or other metal oxide) with a soluble salt of the metal, such as, for example, platinum nitrate, gold chloride, rhodium nitrate, tetraamine palladium nitrate, barium formate, followed by drying and preferably calcination. Catalytic converters for power plant exhaust streams, especially for vehicles, can be prepared from the skinned honeycomb in that manner.

Suitable methods for depositing various inorganic materials onto a honeycomb structure are described, for example, in US 2005/0113249 and WO2001045828. These processes are generally in relation to the skinned honeycomb of this invention.

In an especially preferred embodiment, alumina and platinum, alumina and barium or alumina, barium and platinum can be deposited onto the honeycomb in one or more steps to form a filter that is simultaneously capable of removing particulates such as soot, $NO_x$ compounds, carbon monoxide and hydrocarbons from a power plant exhaust, such as from vehicle engines.

The following examples are provided to illustrate the invention, but are not intended to limit the scope thereof. All parts and percentages are by weight unless otherwise indicated.

EXAMPLE 1

A monolithic acicular mullite honeycomb having square axial cells is prepared. The honeycomb contains about 31 cells per square centimeter (about 200 cells/in$^2$) of cross-sectional area. The integral skin of the honeycomb is machined off to produce a skinless honeycomb with a circular cross-section. The honeycomb has a length of 6 inches (15.2 cm) and a diameter of 5.66 inches (14.4 cm).

A skin-forming composition is prepared by mixing together 42 parts of a ball milled aluminum zirconium silicate fiber (FIBERFRAX Long Staple Fine fiber, available from Unifrax LLC), 13 parts of colloidal alumina (AL20SD, available from Nyacol Nano Technologies, Inc.), 41 parts of water, 2 parts of methyl cellulose and 2 parts of a 400 molecular weight polyethylene glycol. A portion of the resulting composition is cast into blocks. Another portion is used to coat the periphery of the acicular mullite monolithic honeycomb. The skin-forming composition is applied by securing the honeycomb on a lathe using two platens. A trowel is mounted near the surface of the honeycomb to smooth the applied skin-coating composition and control its thickness. The honeycomb is rotated, vacuum is applied through one of the two platens, and the skin-forming composition is applied via a caulking gun. The vacuum sucks the composition onto the surface of the honeycomb and removes water. The applied skin is dry enough to handle two or three minutes after it has been applied.

The skinned honeycomb is then fired to 1100° C. by heating it at a rate of 1° C./minute until a temperature of 600° C. has been obtained, and then at a rate of 5° C./minute. The skin is held at 1100° C. for two hours and then cooled to room temperature at 5° C./minutes. The cast blocks are cut into blocks of 8 mm×4 mm×40 mm and fired in the same manner.

The composition of the resulting skin is 76% of inorganic fibers and 24% of an alumina binding phase.

Figure 2:
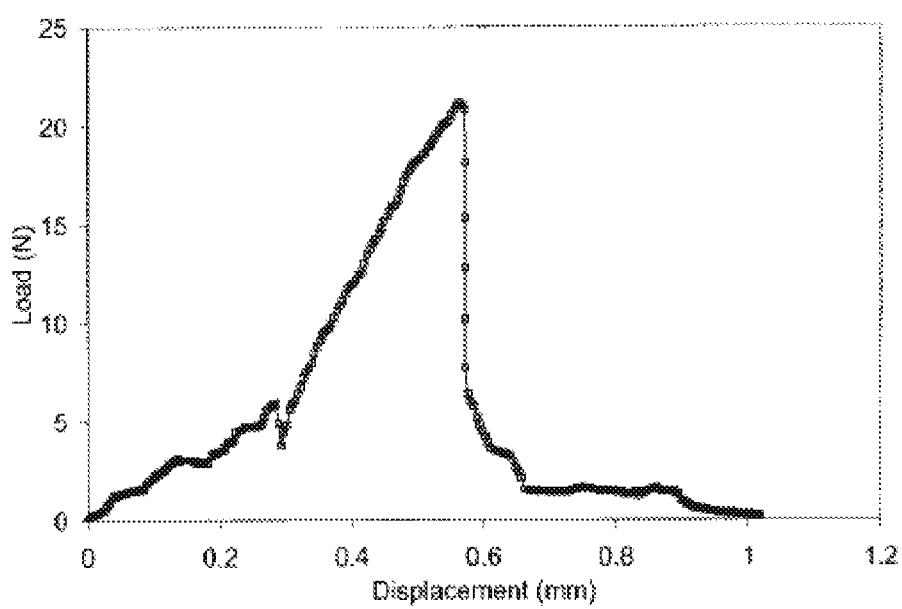
FIG. 2 is a graph of the load displacement curves of a four point bend test of the honeycomb structure of Example 1.

The fracture behavior of the fired blocks is determined using a four-point bending test, using an apparatus as illustrated in FIG. 1. The upper span is 20 mm and the lower span is 40 mm. Downward force is applied onto the block, using an Instron 5543 Load Frame operating at a speed of 0.02 inch/minute. The load data versus displacement is recorded. Results are shown graphically in FIG. 2; those results are indicative of a fracture resistant material.

Modulus is measured on the fired blocks per ASTM 1259-98, using a Grindosonic impulse excitation apparatus. Results are as indicated in Table 1 below. Porosity of the skin is estimated by measuring the porosity of the fired blocks using water intrusion methods, and found to be approximately 60%.

Thermal shock resistance is evaluated using a cyclic burner test. The skinned honeycomb is placed into a can and connected to inlet and outlet pipes through two cones. Fuel is injected into a burner to generate hot air, which is introduced to the can through the inlet cone and removed from the outlet cone. Thermal shock conditions are established through control of the rate of temperature increase and the flow rate. The test regime consists of seven increasingly severe sets of conditions. The part is cycled through each of these sets of conditions 5 times before being passed to the next, more severe set of conditions. After the part is cycled 5 times though a set of conditions, it is inspected for cracking before being subject to the next set of conditions. The test conditions are:

| Level | Rate of Temperature Increase, ° C./min | Flow rate, cubic feet/minute |
|---|---|---|
| 1 | 111 | 80 |
| 2 | 170 | 100 |
| 3 | 222 | 100 |
| 4 | 333 | 100 |
| 5 | 333 | 80 |
| 6 | 333 | 40 |
| 7 | 620 | 40 |

Results are as reported in Table 1 below.

EXAMPLE 2

A honeycomb is prepared and skinned in the same manner as described in Example 1, except this time the honeycomb is segmented. The individual segments have 3.8 cm×3.8 cm (1.5"×1.5") cross-sections. Sixteen of these segments are arranged in a 4×4 pattern, and are cemented together using the skin-forming composition described in Example 1. The assembly is then fired to 1100° C. for 2 hours, cooled, and machined to a 14 cm (5.66 in) diameter and 15 cm (6 inch) length. The skin-forming composition is then applied to the segmented honeycomb, dried and fired in the manner described in Example 1. The resulting skinned honeycomb is subjected to the cyclic burner test described in Example 1. Results are as indicated in Table 1 below.

EXAMPLE 3

Example 1 is repeated, except this time the skinned part is fired to 1400° C. by heating to 360° C. at a rate of 1.5° C./minute, from 360° C. to 800° C. at a rate of 2° C./minute, and from 800° C. to 1400° C. at 2.5° C./minute. The structure is held at 1400° C. for 6 hours before cooling to 800° C. at a rate of 2.5° C./minute and then to room temperature at 3° C./minute. The cooled skinned honeycombs are evaluated in the cyclic burner test described in Example 1. As in Example 1, test bars are made; in this case, they are fired in the same manner as just described and their modulus is measured as described in Example 1.

COMPARATIVE EXAMPLE A

A monolithic acicular mullite honeycomb is prepared in the general manner described in Example 4 of WO 03/082773 A1, and fired to 1400° C. as described therein. The honeycomb has an integral skin which is not removed. The honeycomb is subjected to the cyclic burner test described in Example 1; results are as indicated in Table 1. Test bars are made from the same starting material and fired in the same manner. The modulus of the test bars is measured in the manner reported in Example 1. Results are as indicated in Table 1.

COMPARATIVE EXAMPLE B

A monolithic acicular mullite honeycomb is prepared and machined as described in Example 1. A skin-forming composition is prepared by mixing 72 parts of mullite powder (Mulcoa 70 325 MC, from CE Materials), 4 parts of clay (Todd Dark Ball Clay, from Kentucky-Tennessee Clay Company) and 24 parts of water. This composition is applied to the machined honeycomb, and the resulting product is fired to 1400° C. as in Example 2. The product is then subjected to the cyclic burner test described in Example 1. Test bars are also made from the skin-forming composition and evaluated for modulus as described in Example 1. Results are as reported in Table 1.

COMPARATIVE EXAMPLE C

Comparative Example B is repeated, except this time the skin-forming composition is prepared by mixing 68 parts of mullite powder (Mulcoa 70 325 MC, from CE Materials), 8 parts of clay (Todd Dark Ball Clay, from Kentucky-Tennessee Clay Company) and 24 parts of water. The product is subjected to the cyclic burner test described in Example 1. Test bars are also made from the skin-forming composition and evaluated for modulus as described in Example 1. Results are as reported in Table 1.

TABLE 1

| Ex. or Comp. Ex. | Modulus, GPa | Cyclic Burner Test Condition | | | | | | |
|---|---|---|---|---|---|---|---|---|
| | | 1 | 2 | 3 | 4 | 5 | 6 | 7 |
| 1 | 1.6 | Pass[1] | Pass | Pass | Pass | Pass | Pass | Fail[2] |
| 2 | N.D.[3] | Pass | Pass | Pass | Pass | Pass | Pass | Pass |
| 3 | 4.7 | Pass | Pass | Pass | Pass | Pass | Pass | N.D. |
| A* | 28 | Pass | Pass | Fail | Fail | Fail | Fail | Fail |
| B* | 29 | Fail | Fail | Fail | Fail | Fail | Fail | Fail |
| C* | 22 | Fail | Fail | Fail | Fail | Fail | Fail | Fail |

*Not an example of the invention.
[1]Pass means no cracking is seen on visual inspection, or inspection via a boroscope.
[2]Fail means cracking is visible in visual inspection and/or on boroscope inspection.
[3]N.D. means "not determined".

In Table 1, examples 1 and 3 are the most direct comparisons to Comparative Sample A. Whereas the honeycomb having its original, integral skin (comp. sample A) performs poorly on the cyclic burner test, examples 1 and 3 pass all but the most stringent conditions of the test. When a segmented honeycomb is substituted for a monolithic honeycomb (Ex. 2 vs. Ex. 1 or 3), results are even better. Comparative Samples B and C show that by replacing the original, integral skin with a mullite cement skin, even poorer results are obtained than when the integral skin is left in place.

EXAMPLE 4

Example 1 is repeated, except this time the skin-forming composition is prepared by mixing 32 parts of a ball milled aluminum zirconium silicate fiber (Cerafiber, 250 micron average length, available from Thermal Ceramics, Inc.), 16 parts of colloidal alumina (AL20SD, available from Nyacol Nano Technologies, Inc.), 48 parts of water, 2 parts of methyl cellulose and 2 parts of a 400 molecular weight polyethylene glycol. The fired skin contains 67% fiber and 33% of an alumina binding phase. Results of cyclic burner testing are similar to those reported with respect to Example 1.

EXAMPLE 5

Example 1 is repeated, except this time the skin-forming composition is prepared by mixing 20 parts of a ball milled aluminum zirconium silicate fiber (Cerafiber, 250 micron average length, available from Thermal Ceramics, Inc.), 19 parts of colloidal alumina (AL20SD, available from Nyacol Nano Technologies, Inc.), 55 parts of water, 3 parts of methyl cellulose and 3 parts of a 400 molecular weight polyethylene glycol. The fired skin contains 52% fiber and 48% of an alumina binding phase. Results of cyclic burner testing are similar to those reported with respect to Example 1.

EXAMPLE 6

Example 1 is repeated, except this time the skin-forming composition is prepared by mixing 40 parts of a ball milled magnesium silicate fiber (Isofrax fibers, available from Unifrax LLC), 8 parts of colloidal alumina (AL20SD, available from Nyacol Nano Technologies, Inc.), 46 parts of water, 3 parts of methyl cellulose and 3 parts of a 400 molecular weight polyethylene glycol. The fired skin contains 83% fiber and 17% of an alumina binding phase. Results of cyclic burner testing are similar to those reported with respect to Example 1. The modulus of the skin material is 1.7 GPa.

What is claimed is:

1. A ceramic structure having (1) a ceramic honeycomb containing multiple axially-extending cells that are defined by intersecting walls and (2) a ceramic skin that covers at least a portion of an outer periphery of the ceramic honeycomb, wherein the ceramic skin, after removal of carrier fluids and organic materials, contains (a) an inorganic filler that includes at least 40 weight percent inorganic fibers having a number average length from 100 microns to 130 millimeters and (b) a silicate, aluminate or alumino-silicate binding phase which binds the inorganic fibers together and bonds the peripheral ceramic skin to the ceramic honeycomb, and further wherein the peripheral ceramic skin contains low aspect ratio inorganic filler particles that have a different coefficient of linear thermal expansion than the inorganic fibers, said low aspect ratio inorganic filler particles constituting from 0 to 1% of the solids of the ceramic skin.

2. The ceramic structure of claim 1, wherein the inorganic filler includes up to 60% by weight of low aspect ratio inorganic filler particles that have the same coefficient of thermal expansion as the inorganic fibers.

3. The ceramic structure of claim 1, wherein the inorganic filler includes up to 60% by weight of shot material included in the inorganic fibers.

4. The ceramic structure of claim 1, wherein the inorganic filler includes from 0 to 5 weight percent of low aspect ratio inorganic filler particles that have the same coefficient of thermal expansion as the inorganic fibers.

5. The ceramic structure of claim 1, wherein the inorganic fibers constitute from 40 to 60% of the weight of the skin.

6. The ceramic structure of claim 5, which passes at least conditions 1-6 of the cyclic burner test.

7. The ceramic structure of claim 1, wherein the honeycomb is an assembly of smaller honeycombs that are cemented together with a cement.

8. The ceramic structure of claim 7, wherein the cement is of the same composition as the skin.

9. The ceramic structure of claim 1, wherein the inorganic fibers are silicate or alumino-silicate fibers that may also contain one or more of rare earths, zirconium, iron, boron and alkaline earths.

* * * * *